United States Patent [19]
Doescher et al.

[11] Patent Number: 5,791,727
[45] Date of Patent: Aug. 11, 1998

[54] OPENABLE COMBINE CAB WINDOW ASSEMBLY

[75] Inventors: Robert D. Doescher; Orlin W. Johnson, both of Geneseo, Ill.

[73] Assignee: Case Corporation, Racine, Wis.

[21] Appl. No.: 751,722

[22] Filed: Nov. 18, 1996

[51] Int. Cl.[6] .................................................. B60J 7/00
[52] U.S. Cl. ................................... 296/190; 296/146.16
[58] Field of Search ................................. 296/187, 190, 296/200, 84.1, 92, 96.11, 96.21, 96.2, 146.15, 146.16

[56] References Cited

U.S. PATENT DOCUMENTS

| | | | |
|---|---|---|---|
| 3,866,969 | 2/1975 | Sandrock et al. | 296/190 |
| 4,007,958 | 2/1977 | Peifer et al. | 296/190 |
| 4,119,341 | 10/1978 | Cood | 296/146.16 |
| 4,416,486 | 11/1983 | McNaught et al. | |

OTHER PUBLICATIONS

Case 1060 Combine.

*Primary Examiner*—Stephen Avila
*Attorney, Agent, or Firm*—Foley & Lardner

[57] ABSTRACT

A window is provided in the cab of a combine, in visual alignment with a window in the harvest bin, and another window in a harvest bin extension if provided, for observation of the interior of the harvest bin by the combine operator. The window in the cab of the combine is pivotally mounted about a horizontal axis near the bottom of the window, such that it may be opened to clean the outside surfaces of the cab, the harvest bin, and the harvest bin extension windows.

22 Claims, 6 Drawing Sheets

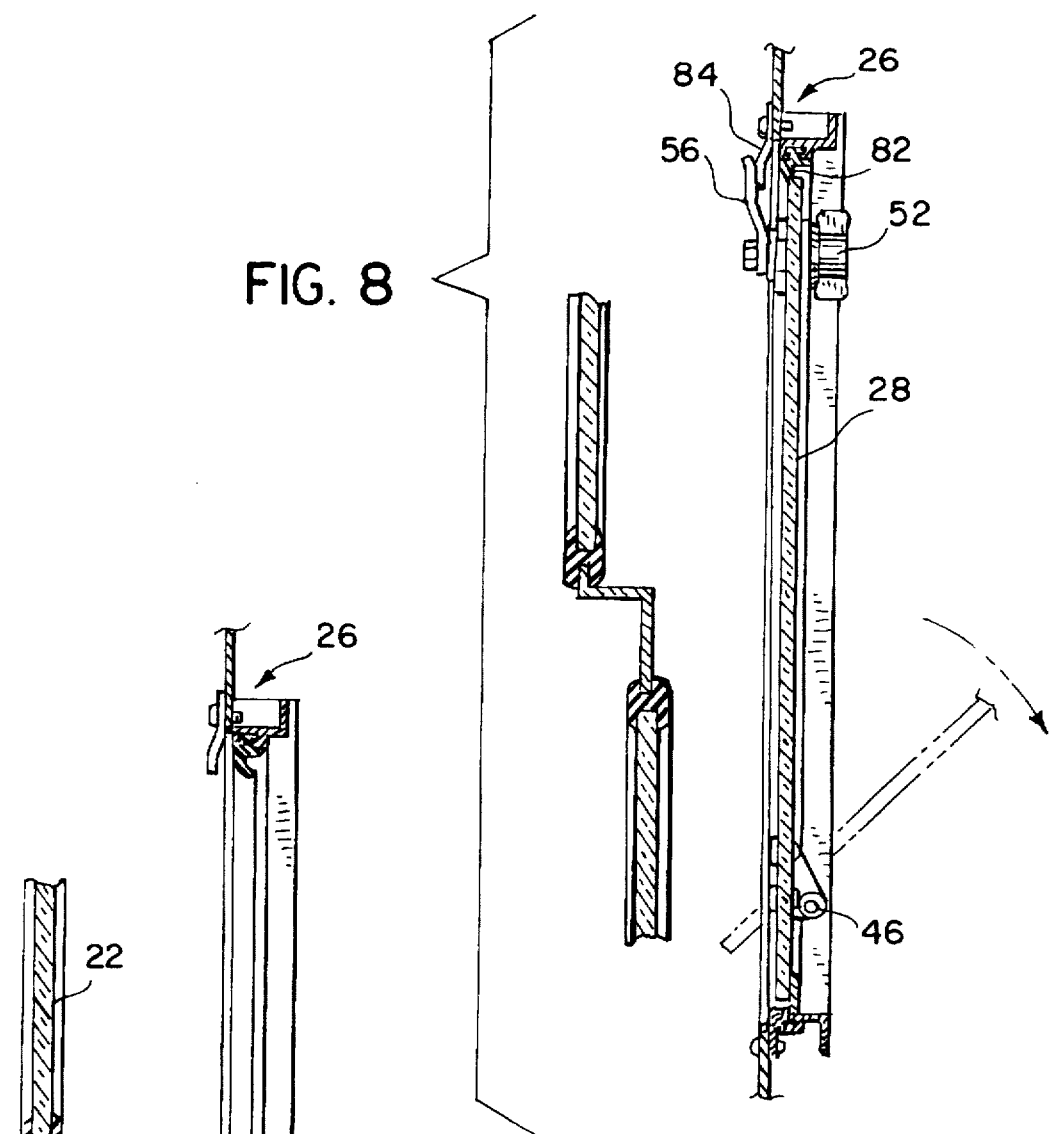
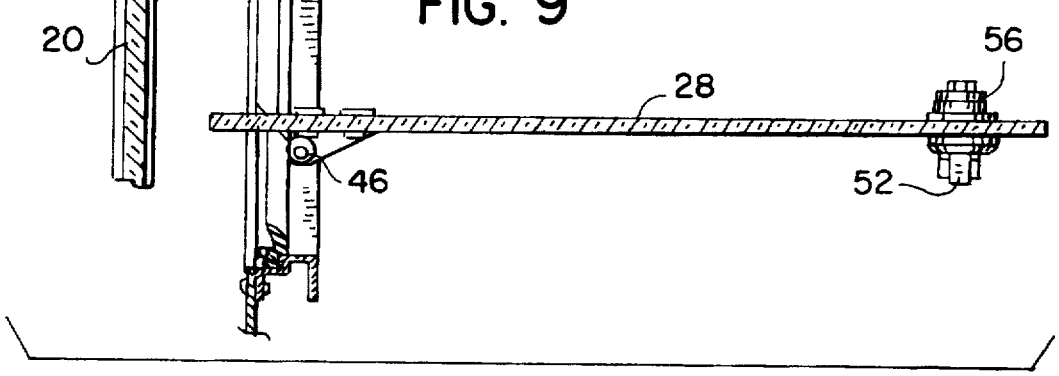

OPENABLE COMBINE CAB WINDOW ASSEMBLY

FIELD OF THE INVENTION

This invention relates to combines, and more particularly to windows provided in the combine operators cab and the harvest bin. A combine operator is able to monitor the operation of the combine by observing the flow of grain into the harvest bin through the windows.

BACKGROUND OF THE INVENTION

Combine operators prefer to see into the harvest bin (tank) to confirm that grain or cotton is being accumulated in the bin and to make a quick check of the cleanliness of the grain delivered to the bin. Even if a combine is equipped with functional and diagnostic instrumentation and performance monitors, a visual check of the grain tank helps reassure the operator that the combine is operating and is properly adjusted for the grain being harvested.

Many combine designs have a grain tank placed directly behind the rear wall of the cab. Typically the walls of the grain tank extend as high as the upper portions of the cab, or even above the top of the cab depending on the particular combine design and whether grain tank extensions are added on top of the tank. Because of the height of the grain tank wall relative to the cab, a window in the rear wall of the cab and either a window or perforated screen in the front wall of the grain tank may be necessary to permit the operator to observe the inside of the grain tank.

To provide for maximum grain tank capacity, the front of the grain tank is located as close as possible to the rear of the cab. The clearance between the rear wall of the cab and the front wall of the grain tank is often inadequate to allow the operator to gain access to that area for cleaning the outside surfaces of the windows. Some combines currently in use require the operator to climb on to the rear of the combine, over the engine, over the top of the grain tank wall (which may be equipped with extensions), forward through the grain tank, around the clean grain auger and grain tank reinforcements to reach the grain tank window from inside the tank. The tank window is then opened to gain access to the outside surfaces of the grain tank and align cab windows. Thus, a combine of this type requires that the grain tank be empty, or close to empty, to clean the windows.

Because combines generate a great deal of dust during normal harvesting operations, the exterior surfaces of the cab and grain tank windows quickly get dirty, thereby diminish the operator's ability to observe the inside of the grain tank.

While horizontally or vertically sliding windows would provide access to the outer window surface from inside the cab, the sliding windows, when used on combines, present other problems. For example, dirt in the window tracks increases the effort required to move the window, may accumulate so as to prevent full opening of the window, and is difficult to remove from the track when compacted therein. Furthermore, it is difficult to provide sealing between the multiple panes of glass. Additionally, it is inconvenient to open and close multiple panes of glass so as to gain access to all of the exterior surfaces of the sliding windows.

A window construction providing convenient access for cleaning the exterior surfaces of the cab and grain tank windows in a combine, without the problems presented by sliding windows, would greatly enhance the operators satisfaction with the combine.

SUMMARY OF THE INVENTION

Accordingly, the present invention provides a window in a combine operator's cab for viewing the inside of the combine grain tank through a window in the grain tank having an outside surface readily cleaned from inside the cab. The window construction, which may also be opened from the inside of the cab to provide access for removing materials deposited on the outside surface of the window and surrounding frame without its falling into the cab during cleaning.

In accordance with one embodiment of the invention, a window assembly is provided in the wall of combine cab, adjacent a window in the combine grain tank, which may be opened from inside the cab to allow cleaning of the exterior surfaces of the cab and grain tank windows from inside the cab. The window assembly includes a window frame and a hinged window pane. The window pane is pivoted about a generally horizontal hinge line located near, but not at the bottom of the window pane. The location and design of the hinge results in the portion of the window pane below the hinge line moving outwardly from the bottom of the window frame, and the portion of the window pane above the hinge line moving inwardly from the top of the window frame when the window is opened. A resilient window seal, attached to the window frame, surrounds the window pane. The window seal shifts from the outside surface of the window pane to the inside surface of the window pane in passing from above the hinge line to below the hinge line. Above the hinge line a lip of the seal overlaps the outside surface of the window pane. Below the hinge line a lip of the seal overlaps the inside surface of the window pane. This arrangement allows the window to shed dust and water because upper surfaces overlap lower surfaces similar to shingles on a roof.

In one embodiment, the cab window may be secured in the closed position by one or more latches located near the top of the window. In a preferred embodiment, two quarter turn latches are provided. The window pane is opened by unlatching the two quarter turn latches and pulling inwardly on the top of the window. If any dirt has accumulated near the bottom edges of the frame, the outward motion of the lower edge of the window pane when opened pushes the material behind the cab, such that it falls downwardly between the cab and the grain tank. The hinge construction results in the window pane acting as a ramp when partially open, such as when it is at an angle of 45 degrees. Dirt on the outside surface of the cab window pane can be swept downwardly and rearwardly from the ramp formed by the window pane, such that it falls to the space between the cab and the grain tank outside the cab. Thus, any dirt on the outside of the window pane is kept out of the interior of the cab. When the cab window is essentially fully open, access is provided for cleaning, through the top portion of the window frame, to the outside surface of the grain tank window.

BRIEF DESCRIPTION OF THE DRAWINGS

FIG. 8 is a cross-sectional view of the window assembly of this invention, incorporated in a grain combine as shown in FIG. 1, with the window pane in the closed position; and FIG. 9 is a cross-sectional view of the window assembly of this invention, incorporated in a grain combine as shown in FIG. 1, with the window pane in the open position.

DETAILED DESCRIPTION OF THE PREFERRED EMBODIMENT

Figure 1:
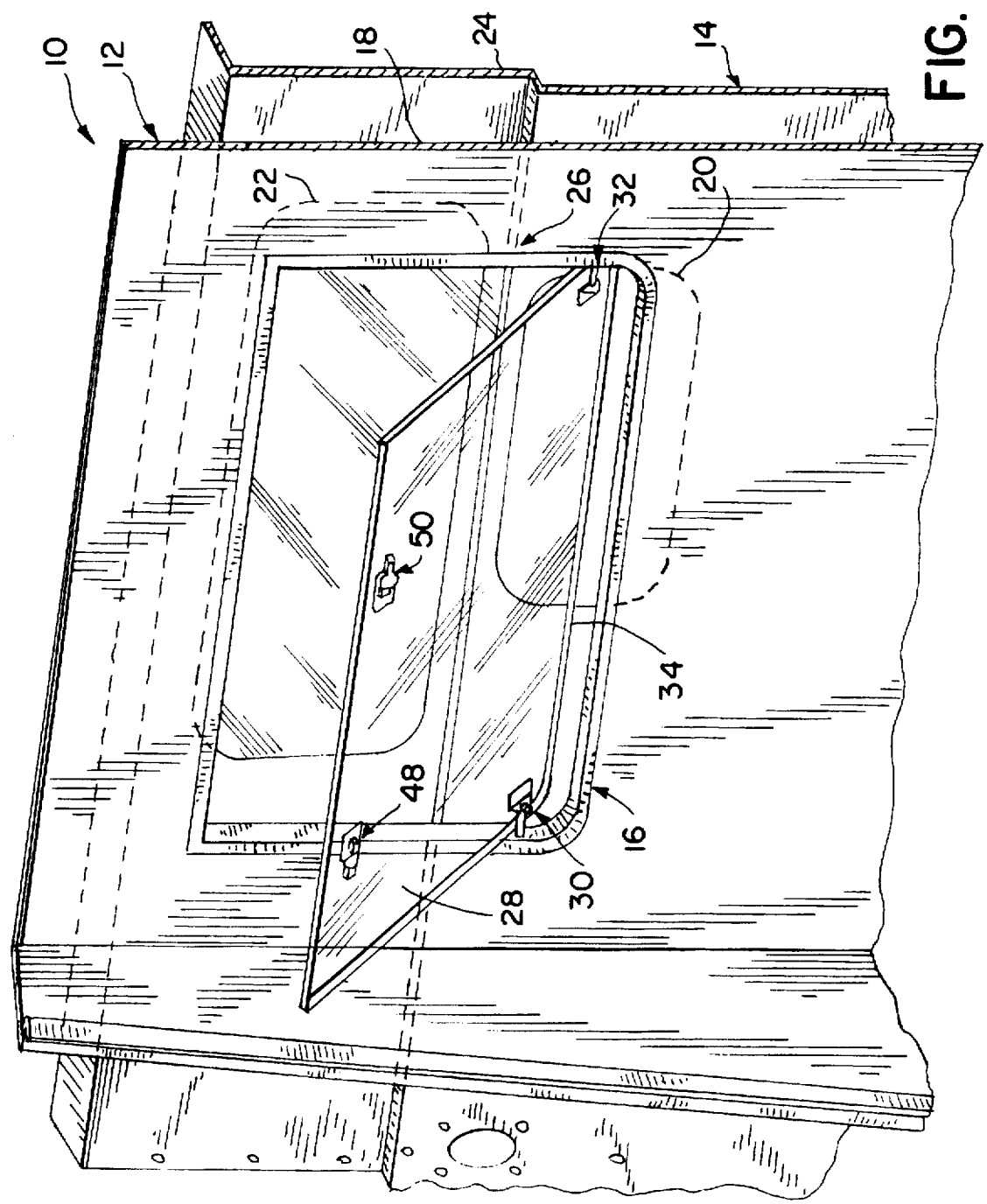
FIG. 1 is a perspective view of a portion of a grain combine showing the combine operator's cab provided with a window assembly in accordance with this invention.

Referring to FIG. 1, a portion of a grain combine 10, including the operators cab 12 and a grain tank 14 located immediately behind the operators cab is shown. An openable window assembly 16 is provided in the rear wall 18 of the operators cab. The openable window assembly 16 is aligned with a window 20 in the grain tank and with a window 22 in a grain tank extension 24. While windows 20 and 22 are shown, they could be replaced with screens, through which the operator could view the interior of the grain tank and the grain tank extension. If a screen is used, it should be of a mesh fine enough to prevent the escape of the grain being harvested from the tank.

Figure 2:
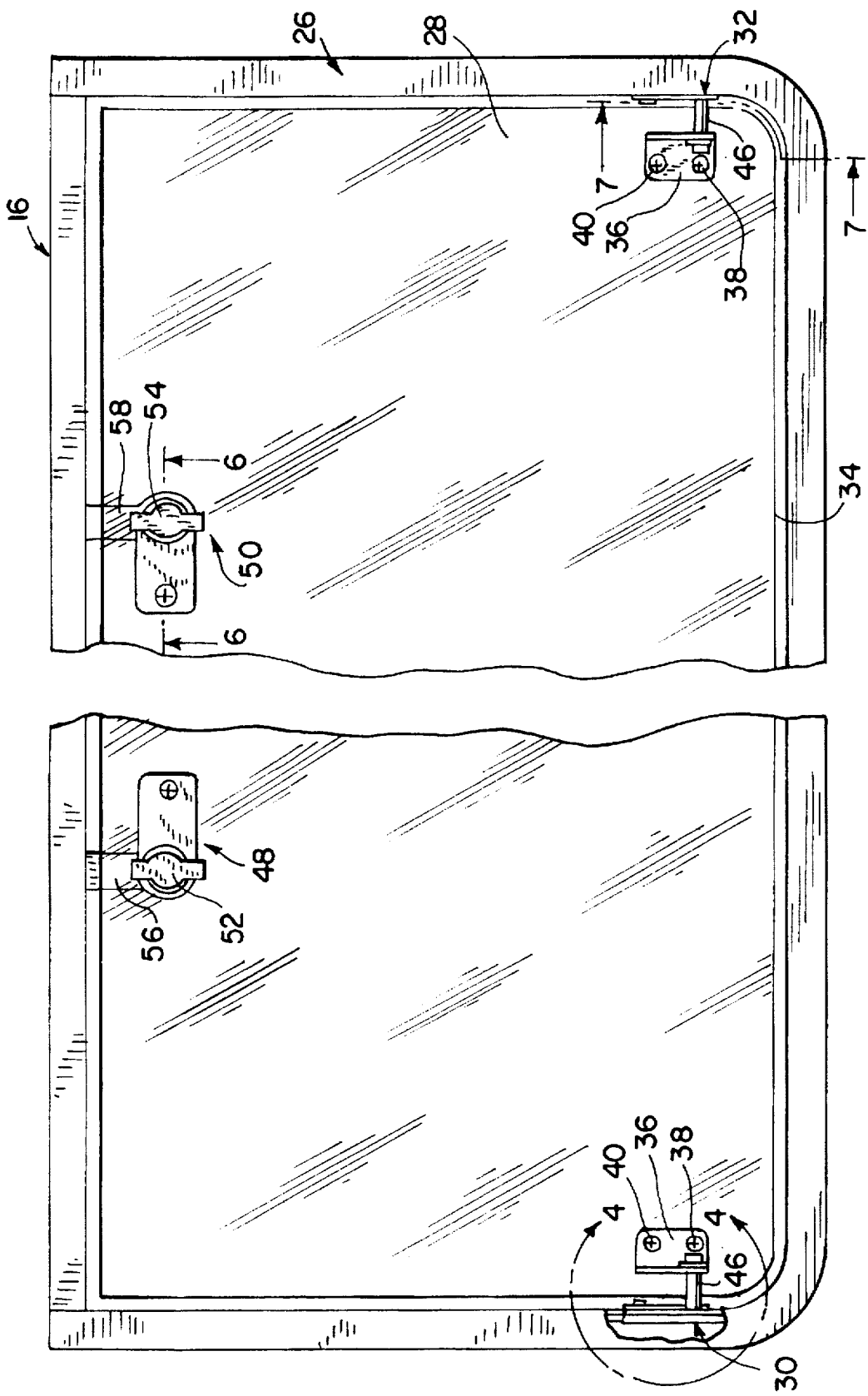
FIG. 2 is an inside plan view of the window assembly of this invention as shown in FIG. 1.

Referring to FIG. 2, the openable window assembly 16 includes a generally rectangular frame 26 which is secured by suitable fastening arrangement, such as rivets or screws, in an opening in the operator cab 12. A window pane 28 is supported within the frame 26 by a pair of hinge assemblies 30 and 32. The hinge assemblies 30 and 32 are located close to, but not at, the lower edge 34 of the window pane 28. However, depending upon the application and associated space limitations, the hinges could be positioned further away from edge 34.

Figure 4:
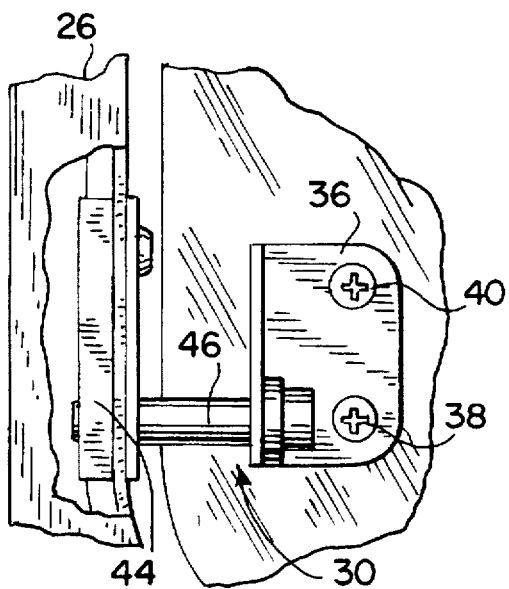
FIG. 4 is an enlarge plan view of a hinge used in the window assembly of this invention as shown in FIG. 1.
Figure 5:
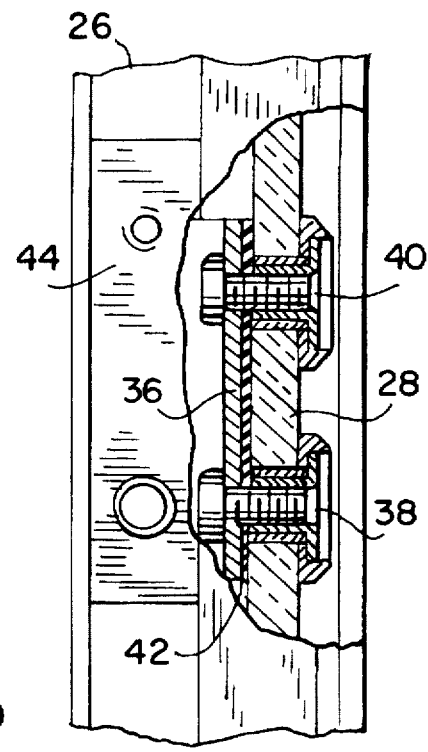
FIG. 5 is an enlarged cross-sectional view of the portion of the hinge shown in FIG. 4, which is secured to the window pane.

Referring to FIG. 4, the hinge assemblies 30 and 32 each include an L-shaped bracket 36 which is secured to the window pane 28 by a pair of fastening devices 38 and 40, shown as screws, which pass through aligned holes in the brackets and in the window pane as best seen in FIG. 5. As shown in FIG. 5, stems of fastening devices 38 and 40 pass through plastic bushings placed in the holes in the glass. In a preferred embodiment, the fastening devices 38 and 40 are polyseal screws and nuts. A resilient material 42 (e.g. adhesive tape, plastic, rubber, etc.) is interposed between the L-shaped bracket 36 and the surface of the window pane 28, so as to accommodate any deviations from flatness of the mating surfaces of the bracket 36 and the glass window pane 28. The hinge assemblies 30 and 32 include a second bracket 44 which is secured to the window frame 26 by suitable fasteners such as screws or rivets. A pivot pin 46 extends between parallel portions of the L-shaped brackets 36 and 44, with the pivot pin 46 being free to rotate with respect to one or the other or both of the brackets, such that the window pane 28 may be pivoted with respect to the rectangular frame 26.

Figure 10:
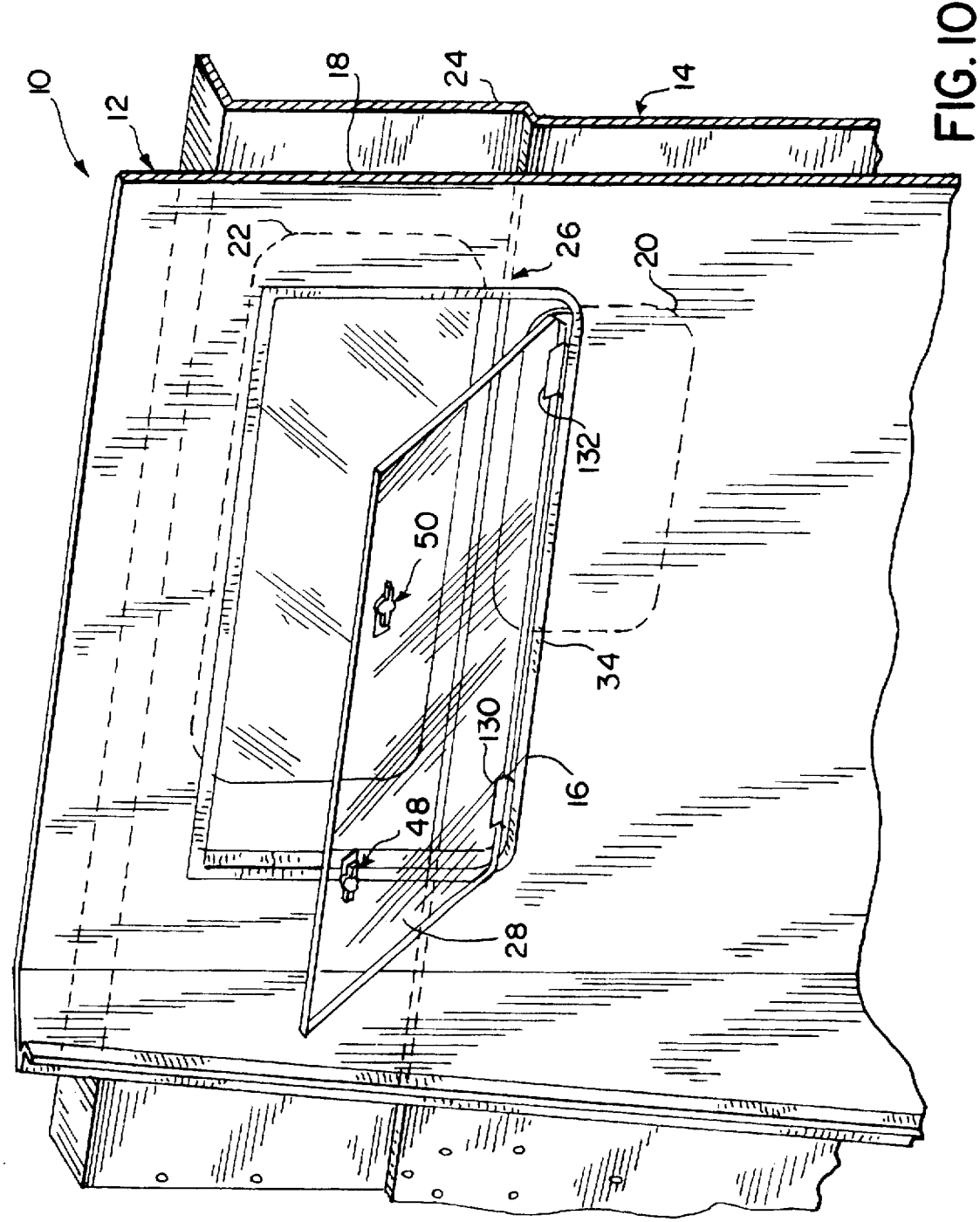
FIG. 10 is a perspective view of a portion of a grain combine showing the combine operators' cab provided with an alternate embodiment of the window assembly illustrated in FIG. 1.

FIG. 10 illustrates a second embodiment of the window assembly 16. In this embodiment, window 28 is pivotally supported within frame 26 by a hinge assembly attached to the bottom edge of window 28 and the corresponding edge of frame 26. The hinge assembly is shown to include two hinges 130 and 132. However, examples of substitutes for hinges 130 and 132 include a single piano-type hinge, a plastic or rubber hinge, or a plurality of plastic or rubber hinges.

Figure 3:
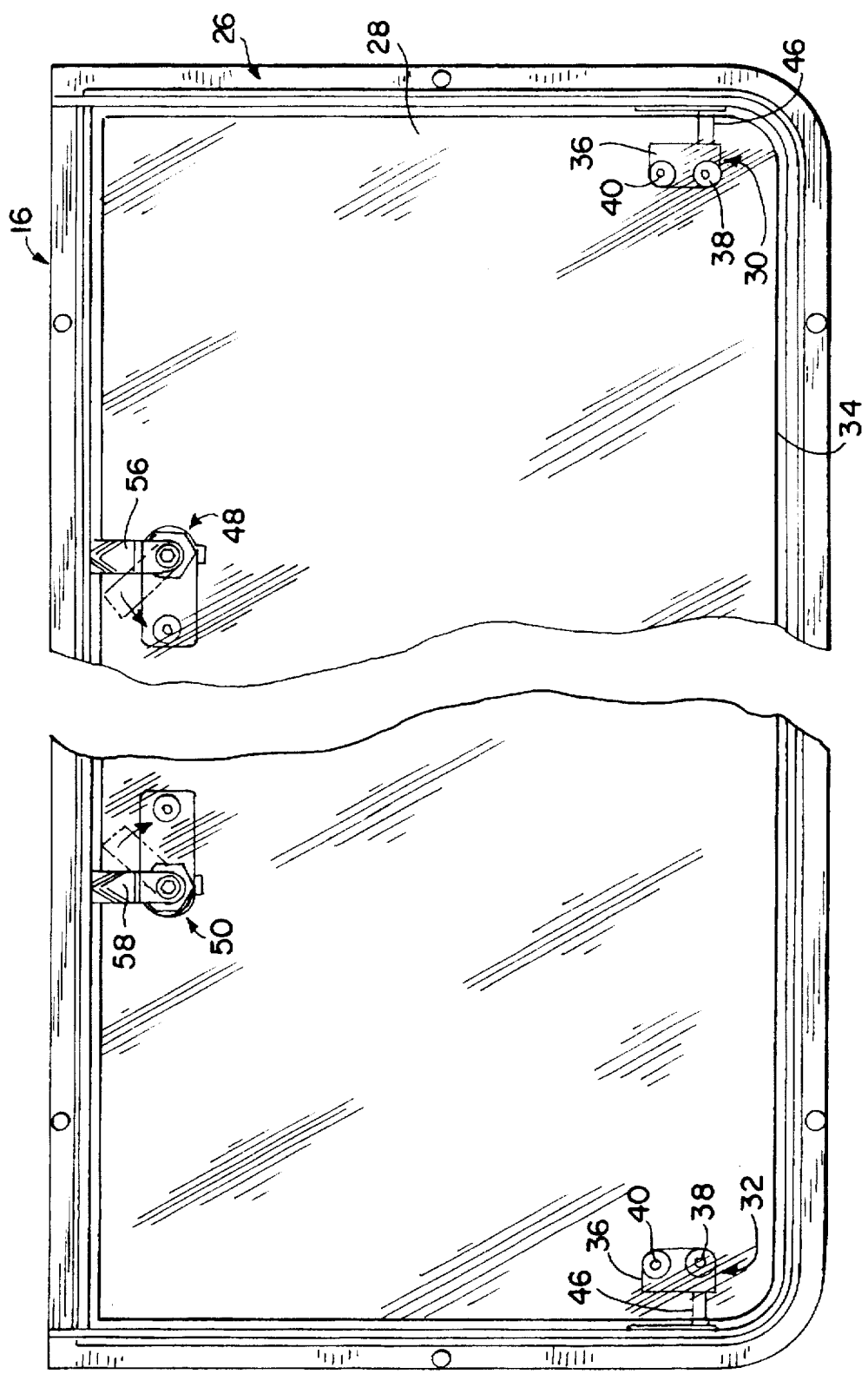
FIG. 3 is an outside plan view of the window assembly of this invention as shown in FIG. 1.
Figure 6:
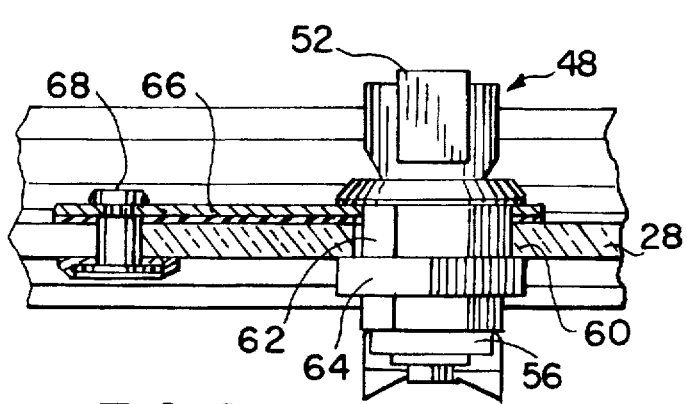
FIG. 6 is an enlarged view of a latching mechanism used in the window assembly of this invention as shown in FIG. 1.

Making reference to FIG. 3, a pair of latch assemblies 48 and 50 are provided at the top of the window. The latch assemblies include a pair of operating knobs 52 and 54 on the inside of the window pane as shown in FIG. 2. The knobs are provided to rotate a pair of latch arms 56 and 58 on the outside of the window pane. Referring to FIG. 6, details of the construction of latches 48 and 50 will be described with reference to latch assembly 48. A cylindrical aperture 60 is provided in the window pane 28, through which passes an operating shaft extending between knob 52 and latch arm 56 enclosed in a housing 62, which in the preferred embodiment has an octagonal outer shape. The outer surface of housing 62 is provided with threads for engagement by a nut 64 which secures the latch assembly 48 to the window pane. The housing 62 is prevented from rotating in the cylindrical hole 60 by an anti-rotation plate 66, which has an octagonal shaped hole in one end, for receiving the octagonally shaped housing 62, and a hole in the opposite end which is in alignment with a hole in the window pane 28, through which hole is received a fastening device 68 which secures the anti-rotation plate to the window pane.

Figure 7:
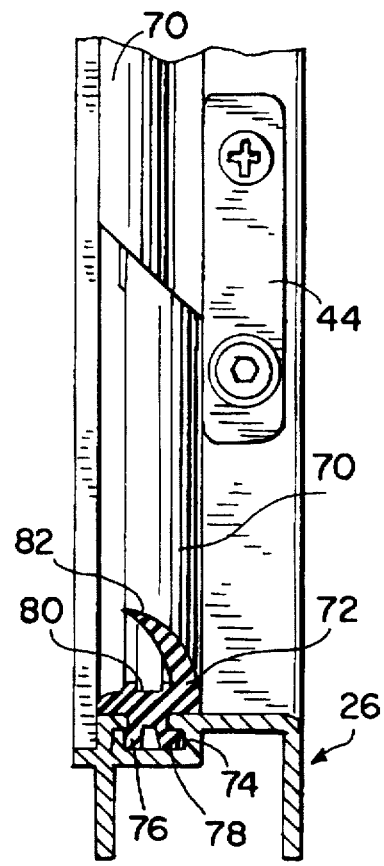
FIG. 7 is an enlarged vertical cross-sectional view of the lower portion of the window assembly.

Referring now to FIG. 7, an arrangement for providing a seal between the window pane 28 and the rectangular frame 26 will be described. The seal between the window pane 28 and the rectangular frame 26 is formed by a resilient sealing strip 70, the cross section 72 of which is shown mounted in the bottom of the window frame 26. The rectangular window frame 26 includes a rectangular groove or slot 74 which extends around the window pane. A pair of securing tabs 76 and 78 of the sealing strip 70 are received in the rectangular groove 74. Sealing strip 70 has a surface 80 which is parallel with the edge of the window pane and which engages the edges of window pane 28. The sealing strip is further provided with a finger-like portion 82 which extends outwardly from the base of the seal and is engaged by a surface of the window pane when the window is closed. The flexible finger-like portion 82 is shown in its natural position, that is when not engaged by the window pane, in FIG. 7.

When engaged by the window pane the finger-like portion 82 is pressed by the window to assume a vertical direction with respect to the horizontal base thus forming a flat seal with the face of the window pane 28. As will be observed in FIG. 7, the sealing strip 70 is positioned in the rectangular groove 74 at the bottom of the frame and on the sides of the frame up to the level of the pivot pins 46, such that the finger-like portion 82 engages the inside surface of the window pane. Above the hinge pivot pins 46 the position of the sealing strip 70 is reversed in the groove 74, such that the finger-like portion 82 engages the outside surface of the window pane.

Referring now to FIG. 8, a partial cross-sectional view shows the aligned cab and grain bin, and grain bin extension windows, with the cab window in the closed position. With the window pane 28 in the closed position, the latch arms 56 and 58 engage latch catch brackets 84 which are secured along the top of the window frame 26. With the window in the closed position the finger-like portion 82 of sealing strip 70 engages the outside surface of the window pane 28 along the top and along the sides down to the location of the pivot pins 46. At the bottom of the frame and on the sides up to the location of the pivot pins 46 the finger-like portion 82 of sealing strip 70 engages the inside surface of the window pane 28.

Referring to FIG. 9, the window pane is shown in the open position. The window pane is moved to the open position by rotating the latch knobs 52 and 54 one-quarter turn to release the latch arms 56 and 58 from the latch catch brackets 84, and then pulling inwardly on the latch knobs. As the top of the window pane is pulled inwardly, the bottom edge moves outwardly, thus pushing any dirt which might have accumulated on the exposed surfaces of the seal, and against the outside lower edge of the window pane, outwardly from the cab such that it will drop into the space between the cab and the grain tank.

If due to the dirty conditions under which the combine is operated, dirt should have accumulated on the outside surface of the window pane 28, it may be brushed or wiped downwardly on the ramp surface formed by the window pane. This dirt will also be kept out of the cab, falling instead downwardly in the space between the rear wall of the cab and the grain tank.

With the window in the open position as shown in FIG. 9, the windows 20 and 22 in the grain tank and the grain tank extension respectively, may be readily accessed through the window frame 26 for cleaning. Further, the outside surface of the window pane 28 is also readily accessible for cleaning. Thus, an operator in the cab, with customary window cleaning supplies on hand, may readily clean the cab window pane 28, and the outside surfaces of windows 20 and 22 in the grain tank and the grain tank extension respectively. Due to the windows position, the operator may kneel or lean against the soft upholstery of the seat cushions while cleaning the windows. No special tools are required and the interior of the cab presents a comfortable area to work. The movement of the grain against the interior surface of the grain tank window as it is accumulated in the grain tank and as it is unloaded from the grain tank tends to keep the interior surface of the grain tank window relatively clean.

While a single embodiment of the invention has been shown, it should be apparent to those skilled in the art that what has been described is considered at present to be preferred embodiment of the window assembly for a combine cab of this invention. Thus, changes may be made in the window assembly for a combine cab as shown and described without actually departing from the true spirit and scope of this invention. For example, the hinges could be positioned to increase or decrease the portion of the window which pivots into the cab. Furthermore, it may be desirable to offset the axes of rotation of the hinges from a common horizontal to cause the window to have components of tilt along both horizontal and vertical axes. By way of further example, the operator's line of sight into the grain bin may be modified with devices such as mirrors. The appended claims are intended to cover all such changes and modification which fall in the true spirit and scope of this invention.

What is claimed is:

1. A cab window for the cab of a combine including a harvest bin, the cab window being in visual communication with a bin window in the combine harvest bin, pivotal supports for the cab window being provided at its sides, such that the cab window may be pivoted to bring the top portion of the cab window into the cab and to extend the bottom portion out of the cab, thereby providing access to the outside surfaces of the cab and bin windows from inside the cab.

2. The cab window of claim 1, wherein the pivotal supports include a first portion mounted on the cab window and a second portion mounted on the cab.

3. The cab window of claim 1, wherein a first gasket is supported on the cab to engage the outer surface of the cab window around the edges of the window above the pivotal supports, and a second gasket is supported on the cab to engage the inner surface of the cab window around the edges of the cab window below the pivotal supports.

4. The cab window of claim 1, wherein at least one latching mechanism is provided along the top edge of the cab window to secure the cab window in a closed position.

5. The cab window of claim 1, wherein a frame is provided for mounting the cab window in the cab.

6. The cab window of claim 5, wherein a first gasket is supported on the frame to engage the outer surface of the cab window around the edges of the cab window above the pivotal supports, and a second gasket is supported on the frame to engage the inner surface of the cab window around the edges of the cab window below the pivotal supports.

7. In a combine including a cab and a harvest bin, a cab window provided in the cab in visual communication with a bin window in the combine harvest bin, the cab window being pivotally mounted at its sides adjacent to its bottom, the cab window being pivotable to bring the top portion of the window into the cab, and to extend the bottom portion outside of the cab, whereby the outer surfaces of both windows are accessible from inside the cab.

8. A window in the cab of a combine positioned in visual communication with a bin window in a harvest bin supported by the combine, pivotal supports being provided on each side of the cab window near the bottom of the cab window, the cab window being pivotable on the pivotal supports to bring the portion of the cab window above the pivotal supports into the cab, and to extend the portion of the cab window below the pivotal supports outside of the cab, whereby the outer surfaces of both windows are accessible from inside the cab.

9. The window in the cab of a combine of claim 8, wherein each of the pivotal supports include a first portion mounted on the window and a second portion mounted on the cab.

10. The window in the cab of a combine of claim 8, wherein a first gasket is supported on the cab to engage the outer surface of the window around the edges of the window above the pivotal supports, and a second gasket is supported on the cab to engage the inner surface of the window around the edges of the window below the pivotal supports.

11. The window in the cab of a combine of claim 8, wherein at least one latching mechanism is provided at the top of the window to secure the cab window in a closed position.

12. The window in the cab of a combine of claim 8, wherein a frame is provided for mounting the cab window in the cab.

13. The window in the cab of a combine of claim 12, wherein a first gasket is supported on the frame to engage the outer surface of the window around the edges of the window above the pivotal supports, and a second gasket is supported on the frame to engage the inner surface of the window around the edges of the window below the pivotal supports.

14. A window combination for a combine having a harvest bin and a operator cab defined, in part, by walls, the combination comprising:

a bin window supported in the wall of the harvest bin; and a cab window pivotally supported by a wall of the cab such that an operator located in the cab can see into the harvest bin, the cab window including top, bottom and side edges, and being pivotable at at least one of its edges so that the cab window may be pivoted to bring the top edge of the window into the cab, thereby providing access to the outside surface of the cab window from the inside of the cab.

15. The combination of claim 14, wherein the window is pivotally supported at side edges; such that the bottom edge of the window moves outside the cab when the window is pivoted.

16. The combination of claim 15, comprising pivotal supports each including a first portion mounted on the window and a second portion mounted on the wall.

17. The combination of claim 14, wherein the window is pivotally supported at the bottom edge thereof.

18. The combination of claim 17, wherein a gasket is supported by the wall to engage the outer surface of the window around the edges of the window.

19. The combination of claim 14, wherein at least one latching mechanism is provided along the top edge of the cab window to secure the cab window in a closed position.

20. The combination of claim 18, wherein at least one latching mechanism is provided along the top edge of the cab window to secure the cab window in a closed position in engagement with the first and second gaskets.

21. The combination of claim 14, further comprising a frame configured to mount the cab window in the wall.

22. The combination of claim 16, wherein the window supports are mounted to the lower half of the cab window.

* * * * *